United States Patent
Ballal

(10) Patent No.: US 9,990,270 B2
(45) Date of Patent: Jun. 5, 2018

(54) SYSTEMS AND METHODS TO IMPROVE DECISION MANAGEMENT PROJECT TESTING

(71) Applicant: Fair Isaac Corporation, San Jose, CA (US)

(72) Inventor: Pradeep Niranjan Ballal, Singapore (SG)

(73) Assignee: FAIR ISAAC CORPORATION, San Jose, CA (US)

(*) Notice: Subject to any disclaimer, the term of this patent is extended or adjusted under 35 U.S.C. 154(b) by 1 day.

(21) Appl. No.: 15/072,262

(22) Filed: Mar. 16, 2016

(65) Prior Publication Data
US 2017/0270032 A1    Sep. 21, 2017

(51) Int. Cl.
G06F 9/44    (2018.01)
G06F 11/36   (2006.01)

(52) U.S. Cl.
CPC .............. G06F 11/3672 (2013.01)

(58) Field of Classification Search
CPC ........... G06F 11/3672; G06F 11/3676; G06F 11/3664; G06F 11/368; G06F 11/3684; G06F 17/5009; G06F 8/10
See application file for complete search history.

(56) References Cited

U.S. PATENT DOCUMENTS

| | | | | |
|---|---|---|---|---|
| 6,212,675 B1* | 4/2001 | Johnston | ............ | G06F 11/3664 714/38.14 |
| 8,346,526 B1* | 1/2013 | Portal | ................ | G06F 17/5009 703/13 |
| 8,490,067 B2* | 7/2013 | Boettcher | ........... | G06F 17/5022 717/124 |
| 9,146,838 B2* | 9/2015 | Boissy | ................ | G06F 11/3664 |
| 2006/0123389 A1* | 6/2006 | Kolawa | ............... | G06F 11/3616 717/101 |
| 2008/0263505 A1* | 10/2008 | StClair | ..................... | G06F 8/10 717/101 |
| 2009/0300587 A1* | 12/2009 | Zheng | ................. | G06F 11/3676 717/127 |
| 2010/0146420 A1* | 6/2010 | Bharadwaj | ............ | G06F 3/0481 715/764 |
| 2010/0169853 A1* | 7/2010 | Jain | ..................... | G06F 17/5022 716/104 |

(Continued)

*Primary Examiner* — Duy Khuong T Nguyen
(74) *Attorney, Agent, or Firm* — Mintz Levin Cohn Ferris Glovsky and Popeo, P.C.

(57) ABSTRACT

A coverage monitor subsystem receives an electronic message from a project data object over a communication network. The project data object includes decision code modules that have rules with a corresponding test status variable. The test status variable indicates whether the rule has been tested. The coverage monitor subsystem generates a test status identifier. The test status identifier indicates the decision code modules as tested decision code modules when all of the rules for the corresponding decision code modules have been tested. The coverage monitor subsystem transmits test status data to a reporting subsystem. The test status data includes a first identifier identifying the tested decision code modules and a second identifier identifying the decision code modules that are not tested. The reporting subsystem displays, at a computer display, a graphical representation based on the first identifier and the second identifier.

18 Claims, 12 Drawing Sheets

(56) References Cited

U.S. PATENT DOCUMENTS

2012/0284697 A1\* 11/2012 Choppakatla ....... G06F 11/3612
717/127
2014/0279810 A1\* 9/2014 Mann ..................... G06Q 30/00
706/47

\* cited by examiner

Fig. 9

SYSTEMS AND METHODS TO IMPROVE DECISION MANAGEMENT PROJECT TESTING

TECHNICAL FIELD

This disclosure relates generally to enabling visualization of a status of a software module, specifically determining the validation status of components of an executable decision management project and generating profile data used by a visualization program to display the validation status.

BACKGROUND

A decision entity is often a complex and interconnected tree of individual rules, which depending on the result of input to one rule, affects the output of one or more subsequent rules. Eventually, data reflecting a decision, for example, to grant a loan, provide a certain credit score, and the like, are provided based on the outcome of the rules that were analyzed based on the inputted data. To validate a decision entity, the rules can be tested, individually or in combination, by specifying a particular input. Because a decision entity can have hundreds or even thousands of rules, and as a result an extremely large number of permutations leading up to a decision, the decision entity may only be partially tested at any given time.

SUMMARY

In one aspect, a coverage monitor subsystem receives an electronic message from a project data object over a communication network. The project data object includes decision code modules that have rules with a corresponding test status variable. The test status variable indicates whether the rule has been tested. The electronic message can be generated by the project data object and include values of the test status variables.

The coverage monitor subsystem generates a test status identifier. The test status identifier indicates the decision code modules as tested decision code modules when all of the rules for the corresponding decision code modules have been tested. The indication is based on the values of the test status variables corresponding to the decision code modules.

The coverage monitor subsystem transmits test status data to a reporting subsystem. The test status data includes a first identifier identifying the tested decision code modules and a second identifier identifying the decision code modules that are not tested.

The reporting subsystem displays, at a computer display, a graphical representation based on the first identifier and the second identifier. The graphical representation includes a first graphical representation of the tested decision code modules and a second graphical representation of the decision code modules that are not tested. The second graphical representation includes a graphical feature that visually distinguishes it from the first graphical representation.

In some variations one or more of the following can optionally be included.

The graphical representation can include a run identifier corresponding to a previous transmitting of the first identifier and the second identifier. Also, the graphical representation can include a total number of decision code modules and a tested number of decision code modules. The total number and the tested number can be over a pre-defined time period.

The graphical representation can also include a first graphical representation of a first test metric and a second graphical representation of a second test metric. Each of the test metrics can have a corresponding decision code module. A second graphical representation can identify an outcome based on the first test metric and the second test metric. A third graphical representation can indicate whether the decision code modules corresponding to the first test metric and the second test metric are all tested.

A test entity list can be transmitted to the reporting subsystem. The test entity list can include tests that had previously been executed on an entity in the project data object.

Implementations of the current subject matter can include, but are not limited to, systems and methods consistent with features described herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an decision management project testing toolkit, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 is a graphical representation of a decision coverage report illustrating which rules are validated for a given test case;

When practical, similar reference numbers denote similar structures, features, or elements.

DETAILED DESCRIPTION

This document presents a system and method for improving decision management project validation. Decision making/aiding software can allow a user to define one or more rules, conditions, and the like, to determine, based on input to the decision software, a particular outcome. For example, a user may want to know what credit limit to provide to a customer. The customer's credit history, financial data, and so on, can be input into the decision software. There can be a number of rules that take that data into account in order to arrive at a final determination of what credit limit to suggest to the user. While determination of a credit limit is one example application of such decision software, the features described herein can be applied to any sort of decision software or project.

Part of validating a project that encompasses a decision software package can be the testing of the rules that comprise the project and govern what the project output will be. Testing can include providing a wide range of input data (real or made up solely for testing purposes) to the project. To determine the validation status of a project, which is how much of a project has been tested and which portions have been tested, a validation status monitor can interface with the existing decision framework implementing the project. Once interfaced, the validation status monitor can provide ongoing information about the extent of testing of the project. This information can be used by other computing systems, for example, to create reports or visualizations to aid in project development.

Figure 1:
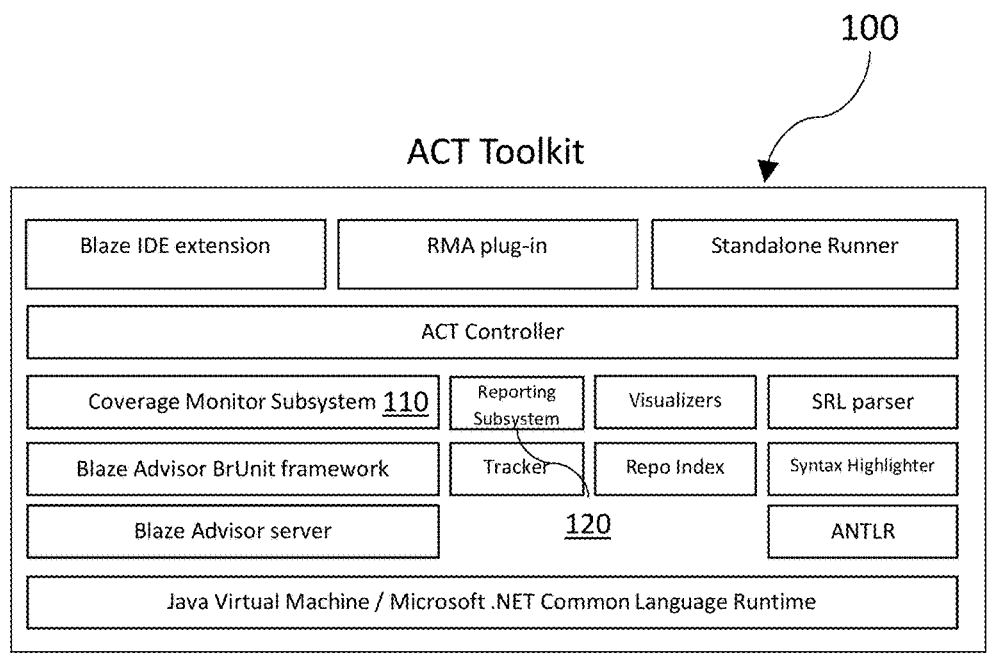
FIG. 1 is a diagram illustrating system architecture of a decision coverage toolkit.

FIG. 1 is a diagram illustrating system architecture of a decision coverage toolkit 100. In one implementation, the decision coverage toolkit 100 can be an add-on to a decision software package (e.g. the BLAZE ADVISOR by FICO, Inc.) that can perform rule & code coverage analysis and generate reports to be used during the development cycle of projects. Rule and Code coverage analysis can include identifying untested and partially tested areas of rule project(s).

The decision coverage toolkit 100 can be written in Java or .NET. The implementations of the decision coverage toolkit 100 can support both 32 bit and 64 bit architectures.

The logical architecture of the decision coverage toolkit 100 can be divided into at least two sub-systems: a coverage monitor subsystem 110 and a reporting subsystem 120. The coverage monitor subsystem 110 can manage the collection of all runtime coverage information by attaching itself to the Blaze Advisor server. To generate the coverage information, the rule engine can receive test data. To run the rule engine, the coverage monitor subsystem 110 can exercise the rules project by executing the unit test cases within the project using unit framework API provided by the rule engine. The unit testing framework can allow marking certain functions as "test" functions meaning that these functions are authored explicitly for testing the decision project. The coverage sub system, via the use of unit test framework API, can automatically invoke these "test" functions. The test functions in turn will invoke rules associated with the unit test cases. The coverage monitor sub system 110 can collect statistics or other data to generate the coverage information. The reporting subsystem 120 can generate reports from information that was collected by the coverage monitor subsystem 110.

The decision coverage monitor subsystem 110 can control some or all runtime data collection. It does this by first attaching itself automatically to the Blaze Advisor rule server (rule engine) and then running all unit test cases in the project through a standalone test runner. The rule server generates events during the execution of the rules in the project and these events are processed into coverage information by the decision coverage monitor sub system 110. While the unit tests are running, the coverage monitor subsystem 110 can track the runtime characteristics and also construct dynamic call graphs. A dynamic call graph can be a record of execution of the decision project and can be output by a profiler within the coverage monitor subsystem 110. These dynamic call graphs can then be processed into reports to track which test cases executed which parts of the decision project.

Data generated by the coverage monitor subsystem 110 can be accessed by the reporting subsystem 120 to generate a variety of reports. The reporting subsystem 120 can contain components to track the coverage information across different runs and report coverage metric variations. The reporting subsystem 120 can also contain components that aid report generation by, for example, syntax highlighting. Syntax highlighting can allow visualizing various metaphors in ways that are either similar to, or exactly as, those seen by the business user while maintaining these metaphors through the web based rules maintenance application. This is important to ensure seamless understanding of the reports by the business user—they see in the reports what they are already used to in the web based rule maintenance application.

These two subsystems can be managed by a controller. The controller can coordinate the tasks between these two subsystems essentially acting as a manager to connect the coverage information outputted by the coverage monitor 110. The controller can also transmit this information into the reporting subsystem 120. In some implementations, the controller can be run from a standalone program to invoke the decision coverage toolkit 100 independently. The decision coverage toolkit 100 can be extensible to add more plug-ins, for example, to be invoked from the rule maintenance application directly.

Figure 2:
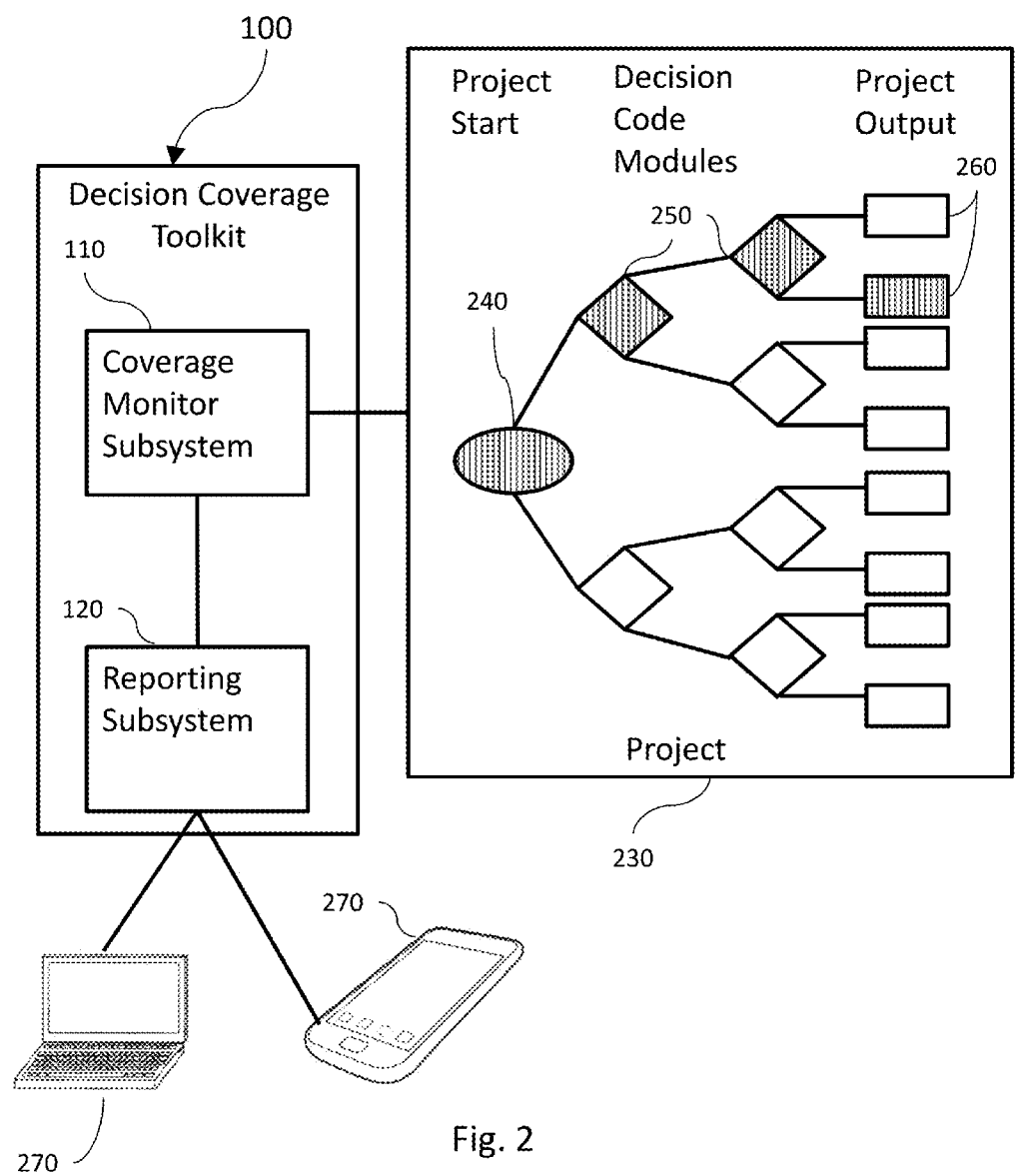
FIG. 2 is a diagram illustrating a decision coverage monitor subsystem and a reporting subsystem monitoring and reporting on the validation status of a project.

FIG. 2 is a diagram illustrating a decision coverage monitor subsystem 110 and a reporting subsystem 120 monitoring and reporting on the validation status of a project 230. The project 230 can be a program structure or data object that receives input data to one or more decision code modules 250 present in the project 230. The input data determines the output of a given decision code module 250 and which, if any, decision code module 250 receives additional input data. The input data can be, for example, text or numbers indicating names, amounts, binary conditions (yes/no, true/false), dates, etc. The example shown in FIG. 2 also includes a project start 240 (or root node) to the project, several intermediate decision code modules 250, and a project output 260. The project start can be similar to any of the decision code modules 250, only differing in that it is the first decision code module 250 accessed. The project output 260 can be a result, for example, a final decision, score, or the like, based on the outcomes determined by the decision code modules 250.

When a decision code module 250 is "tested," that decision code module 250 has received a set of input data that provides expected outcomes for the decision code module 250. Also, to be considered as "tested," the decision code module 250 must be invoked and output of the decision code module 250 is verified to be correct. As used herein, "tested" refers to fully tested and "untested" refers to no testing or only partial testing. The decision code modules 250 can be associated to a test status variable, which can be stored as part of coverage information from the decision coverage monitor sub system 110, and which can have a value indicating the testing status of the decision code module 250.

The coverage monitor subsystem 110 can receive an electronic message from the project 230 over a communication network. The electronic message can be generated by the project 230, either automatically or in response to a received query or command. The electronic message can include values of the test status variables associated with one or more decision code modules 250.

After receiving the electronic message containing the values of the test status variables, the coverage monitor subsystem 110 can generate a test status identifier. The test status identifier can indicate the decision code modules 250 that have been tested and/or indicate decision code modules 250 that are untested. The test status identifier can be, for example, decision tables, decision trees nodes, scorecard model bins, rules within rulesets, code lines within functions and the like, which identify decision code modules 250 and their respective testing status. The identification present in the test status identifier can be based on or include, for example, a name of the decision code module 250, unique ID of the decision code module 250, object ID of the decision code module 250, etc.

The coverage monitor subsystem 110 can transmit test status data to a reporting subsystem 120. The test status data can include a first identifier identifying the tested decision code modules 250 and a second identifier identifying the decision code modules that are not tested (i.e. untested). In this way, the reporting subsystem 120 can directly access a list or other form of the test status data to allow communication of which decision code modules 250 are tested and which ones are not.

As used herein, there can be any manner of visual indications implemented in the graphical output of the decision coverage toolkit 100 or the reports generated by the reporting subsystem 120, to indicate whether a decision code module 250, project 230, rule, and the like, is tested or untested. The visual indications can include, for example, shading, coloring, hatching, highlighting, additional graphical elements like call-outs, text information, icons, etc. In the example project 230 (shown as a decision tree) in FIG. 2, the tested decision code modules 250 are shaded. The untested decision code modules 250 are not shaded. As can be seen in the example of FIG. 2, there is only one tested decision path available in the project. The other decision paths may or may not be accurate, but they are not considered tested, so their output can be suspect.

As described in greater detail below, the reporting subsystem 120 can display a graphical representation of the identified tested decision code modules and the identified untested decision code modules. The graphical representation can be displayed at one or more peripheral computing systems 270. The peripheral computing systems 270 can include, for example, laptop computers, smartphones, desktop computers, tablet computers, etc.

Figure 3:
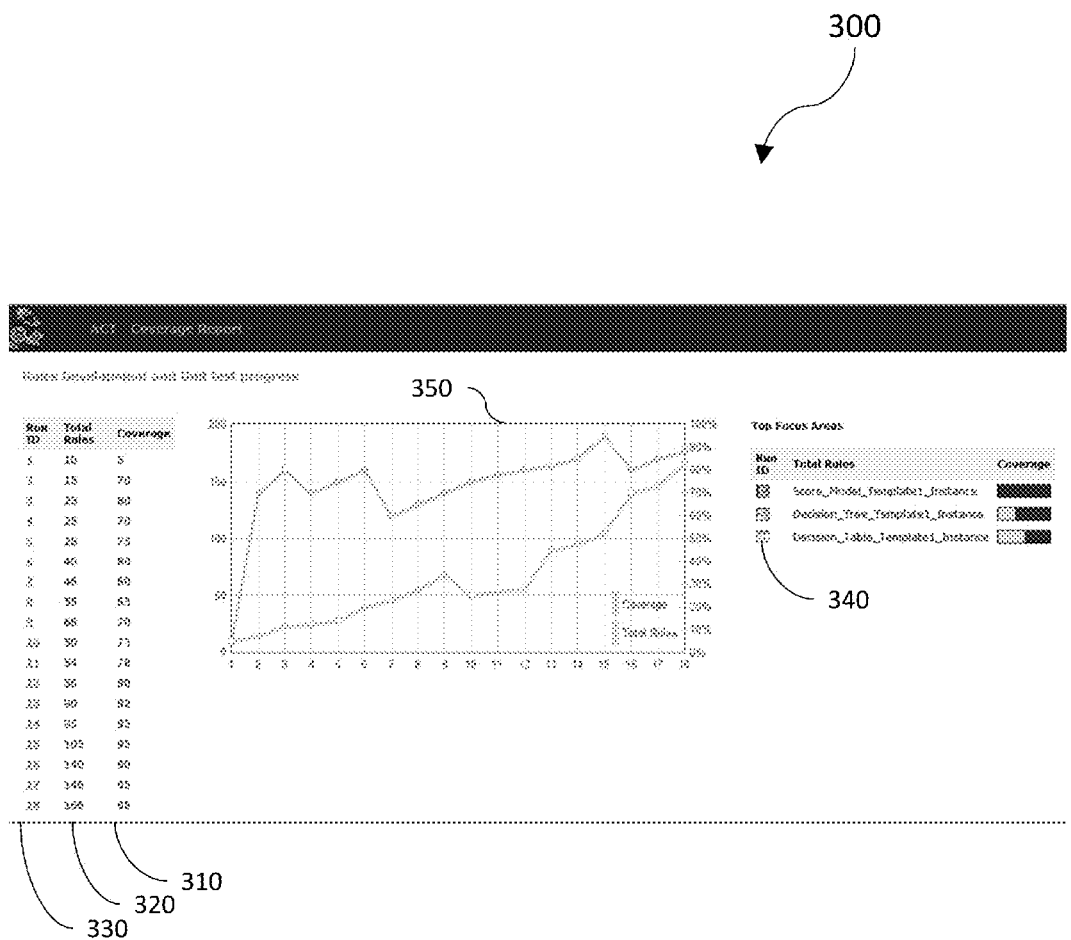
FIG. 3 is a graphical representation of a dashboard report illustrating the decision coverage of a project against time when development continues and the number of rules increases.

FIG. 3 is a graphical representation of a dashboard report 300 illustrating the decision coverage of a project 230 against time when development continues and the number of rules increases. The coverage monitor subsystem 110 can generate one or more reports that describe the testing type, amount of rules tested, time or duration of a test, etc. In one implementation, the dashboard report 300 summarizes the overall rule coverage percentage 310 across test runs. In some implementations the dashboard report 300 can be the first in a series of reports that can be generated by the reporting subsystem 120. Any of the reports described herein can be graphically displayed to a user, stored as data files in a computer memory, or both.

The testing status of a project 230 can be determined any number of times. Between each status update, rules or entire decision code modules 250 can be added, subtracted, or modified. In some implementations, the left side of the dashboard report 300 can display one or more test runs and their corresponding rule coverage percentage 310. The dashboard report 300 can also display a chart, graph, line plot, or other graphical representation of a test run ID number 330, the total number 320 of rules tested for the test with the test run ID number 330, and the coverage percentage 310. The coverage percentage 310 can represent the number of rules tested out of the total number of rules.

The run ID 340 displayed in the right table of the dashboard report 300 can be hyperlinked to the decision coverage details for that run. By clicking on the hyperlinks, information on the decision coverage details of any run since the tool was used can be displayed. The history of each testing run can be accessed by decision coverage toolkit 100. Clicking on the "Run ID" hyperlink 340 can display the coverage summary report for the project 230 for a run ID (see FIG. 4).

In some implementations, the right side of the dashboard report 300 can display a list of project entities that require more testing focus. There can be a default algorithm that selects the entities based on the least rule coverage percentage of the last test run. However, this algorithm can be changed by implementing a different algorithm based on priority, coverage progress across test runs, and the like.

The chart 350 at the middle of FIG. 3 can indicate how the development and testing are progressing. If there are more rules being developed but the coverage metric is straight or dropping it can be an indication that more testing focus is required and thus helps the users prioritize development activities.

Throughout the report visualizations described herein, there can be one or more hyperlinks that allow navigation between reports. In FIG. 3, for example, the numbers under the "run ID" and the names under the "Total rules" are hyperlinked to other reports. Further details regarding the hyperlinking can be found in the description of FIG. 11.

Figure 4:
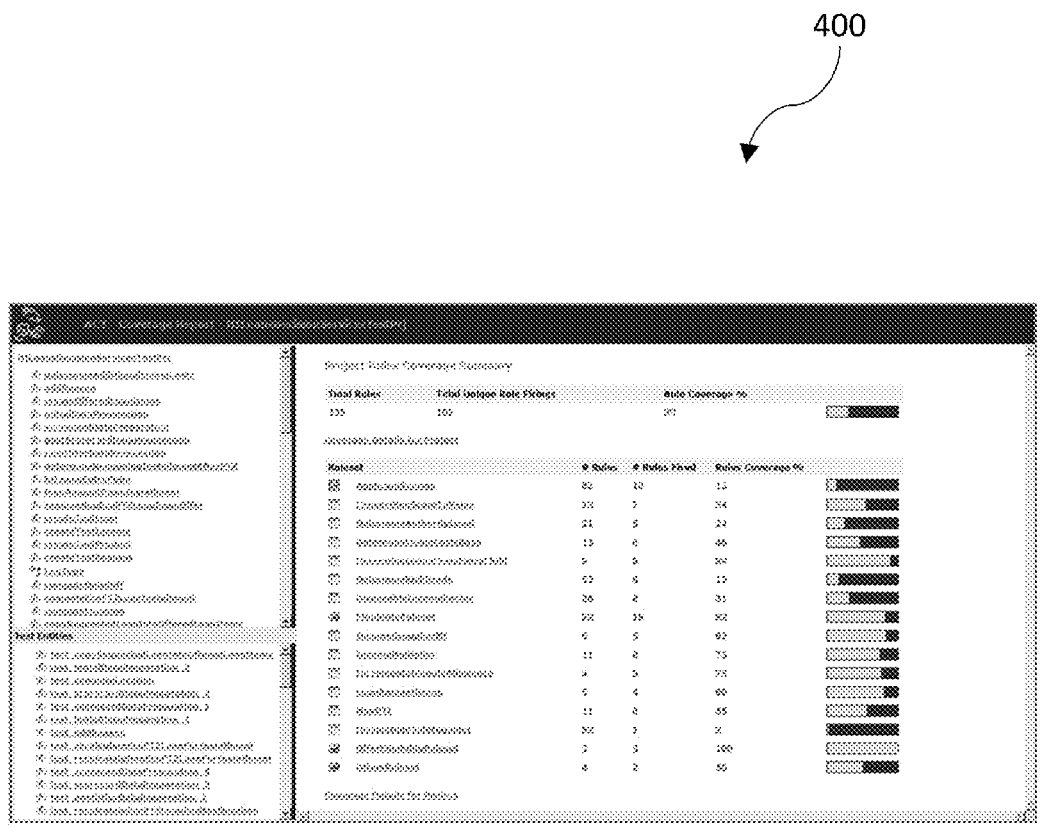
FIG. 4 is a graphical representation of a coverage summary report illustrating the decision coverage of rulesets in the project.

FIG. 4 is a graphical representation of a coverage summary report 400 illustrating the decision coverage of rulesets in the project 230. The coverage summary report 400 can include a summary of the total number of rules in the project and the number of rules that were executed during testing and the overall coverage metric for that run. The coverage summary report 400 can also include a list of decision metaphors within the project and the coverage at that entity level (i.e. # of rules to # rule fired) and a graphical view of coverage progress. The coverage summary report 400 can display (shown in the upper left pane of FIG. 4) a list of all project entities that are used for generating a decision. The coverage summary report 400 can also display (shown in the lower left pane of FIG. 4) the list of unit test cases that were triggered by the unit test runner. All the decision entities names can be hyperlinked such that clicking on any entity displays the coverage detail for that entity. As used herein, an entity can refer to an individual decision code module 250 or to the project 260.

Figure 5:
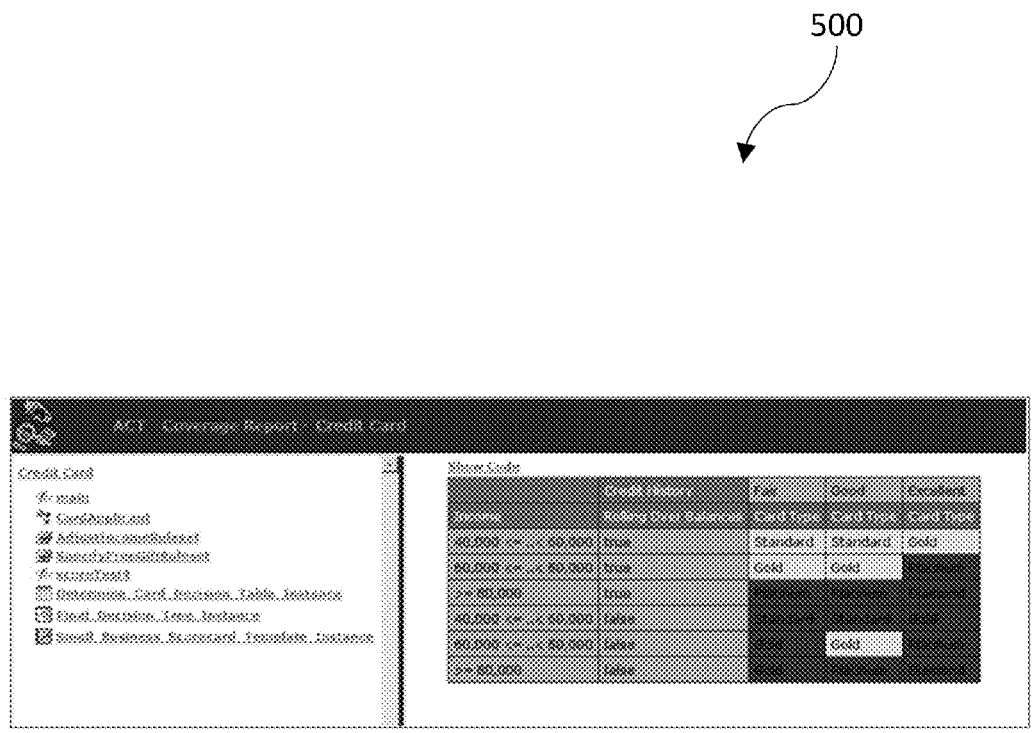
FIG. 5 is a graphical representation of the validation status of decision code modules that provide project outputs.

FIG. 5 is a graphical representation 500 of the validation status of decision code modules 250 that provide project outputs 260. For decision metaphors, there can be visualization support so that the metaphor can be displayed in the same manner as it is, for example, during editing. FIG. 5 illustrates one example of how the coverage can be visualized for a decision table. The project outputs 260, which can be decisions if the project is a decision metaphor, are shown by the "Card Type" columns. The testing status of a project output 260 can be determined based on whether all of the decision code modules 250 have been tested. For example, the decision code modules 250 that test whether income is between 60,000 and 80,000, balances being rolled over, and credit history can be accessed to determine their individual testing status. If the credit history is good, a gold card can be suggested, and the visual indication can show that all of the decision code modules 250 were tested. In contrast, if the credit history is excellent, then a platinum card can be suggested. However, this decision is not fully tested and thus the visual indication can be provided in different shading. In one implementation, action cells (representing the project output 260) that were tested can be colored green and the cells that were not fully tested can be colored red. This type of visualization can indicate which cells need more testing. This can help the user choose the correct type of test case/test data which can test the cell or project output 260.

Figure 6:
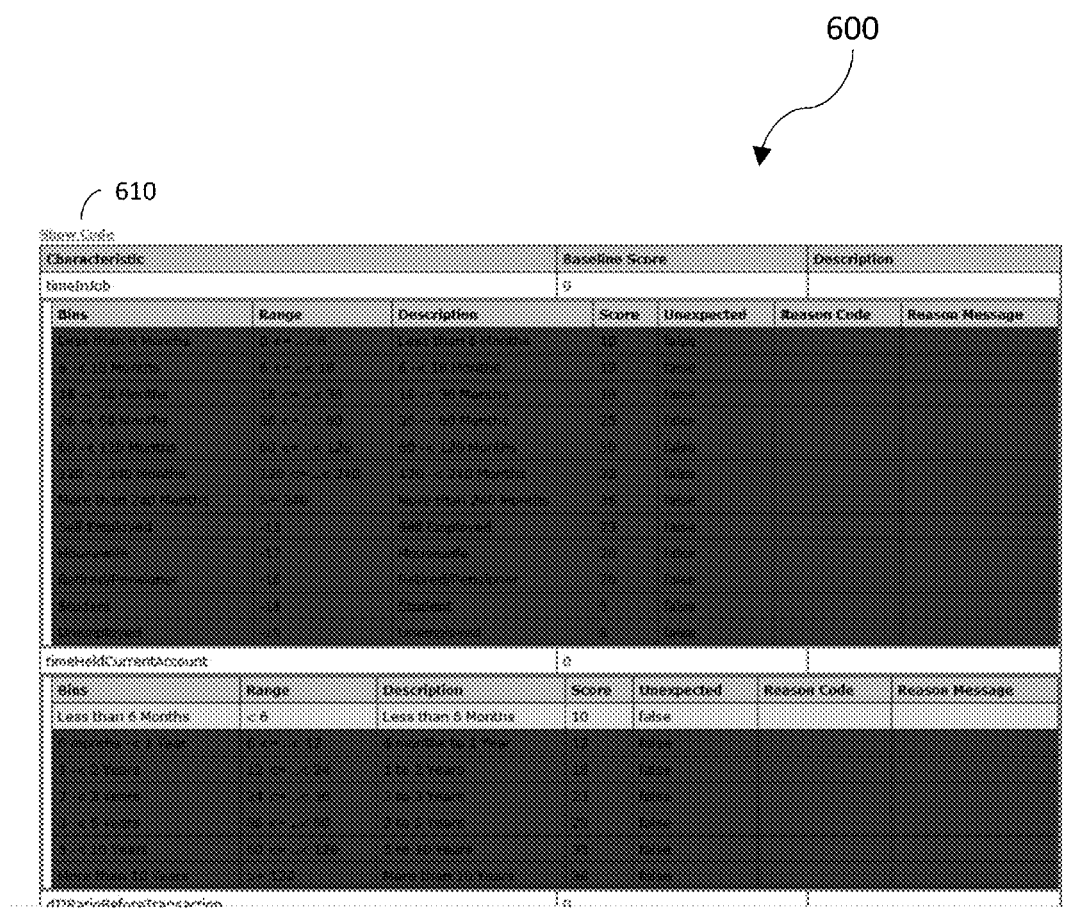
FIG. 6 is a graphical representation of the validation status of individual tests in a decision code module.

FIG. 6 is a graphical representation 600 of the validation status of individual tests in a decision code module 250. In some implementations, graphical representation of scorecard models can be visualized similarly to those described above, such as in FIGS. 3-5. Also similar to the project outputs 260 shown in FIG. 5, the bins of the scorecard model, which correspond to a decision code module 250, can have a visual indication illustrating their testing status. The visual indication can be shading or coloring that describes whether the bin is tested or untested. As shown in the example of FIG. 6, most of the bins are untested.

This graphical representation of the scorecard model can include a hypertext link (or hyperlink) 610 that to display additional details about the scorecard model. In the example of FIG. 6, this is shown by the "Show Code" link at the top of the pane. Clicking this hyperlink can navigate the user to more details on the actual ruleset behind the metaphor and display the rules and the coverage at each statement. This particular functionality (of showing Structured Rule Language (SRL) code) is targeted, and can be restricted to, the power user/IT user rather than an end user. See also FIG. 10 for an example of showing a visualization of the SRL code.

Figure 7:
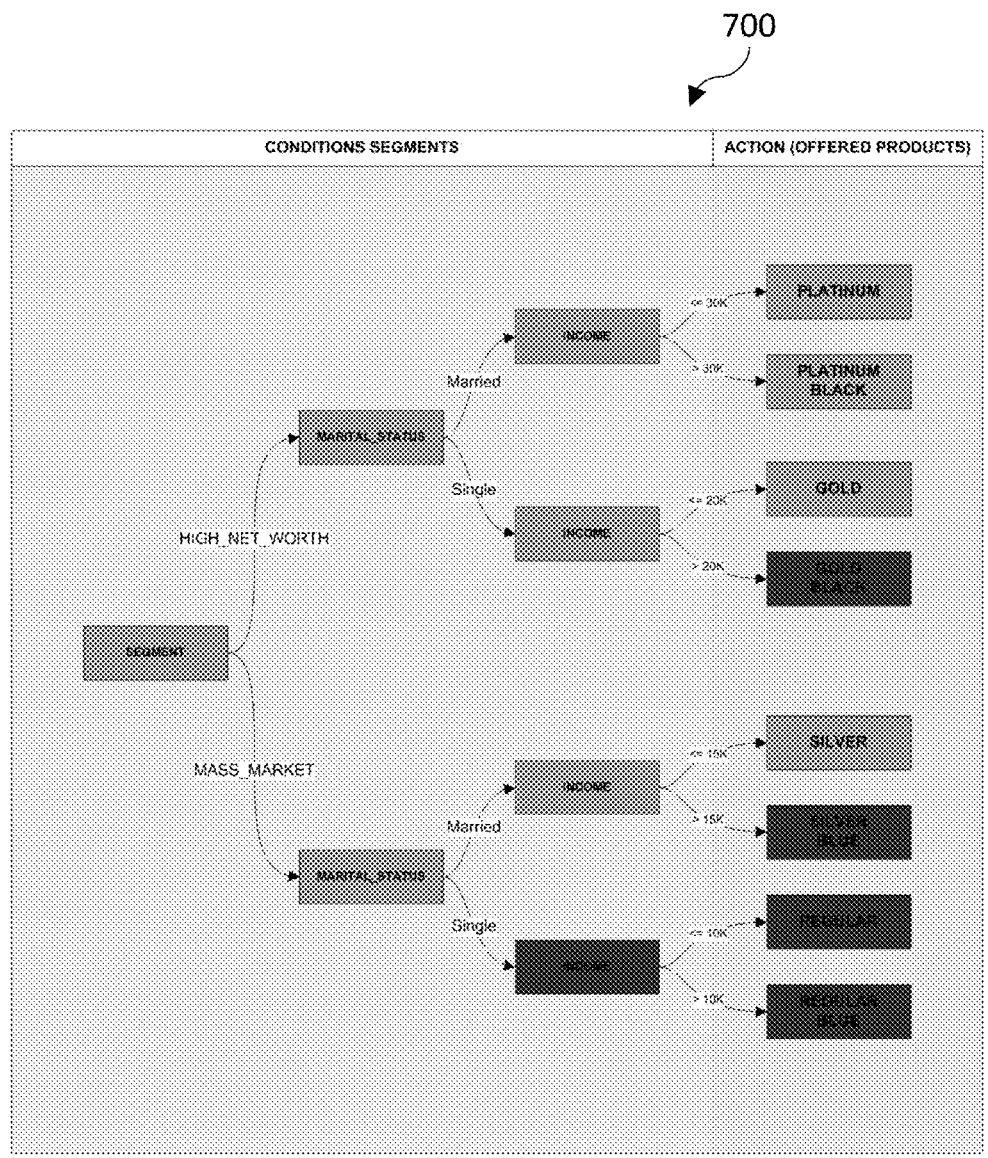
FIG. 7 is a diagram illustrating a decision tree indicating the validation status of decision code modules.

FIG. 7 is a diagram illustrating a decision tree 700 indicating the validation status of decision code modules 250. The decision tree 700 can be generated as a graphical representation in a similar manner to the examples above, although some of the path labels are now part of the node instead of the path. Nodes that are tested or untested can have different visual indicators to display their testing status to a user.

Figure 8:
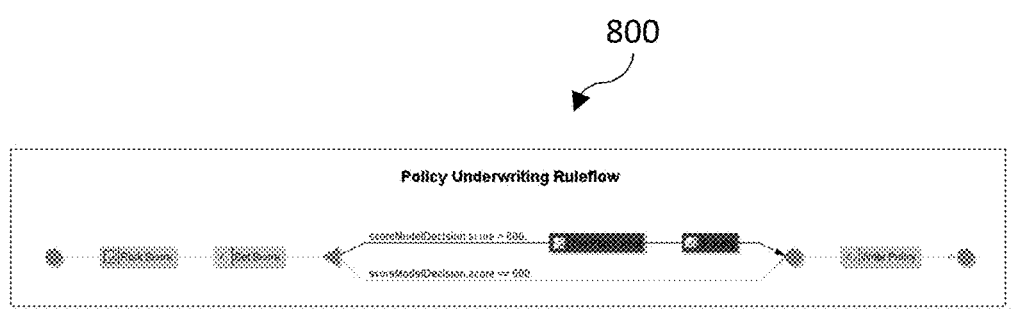
FIG. 8 is a diagram illustrating a ruleflow that includes a visual indication of steps that are not validated in the ruleflow.

FIG. 8 is a diagram illustrating a ruleflow 800 that includes a visual indication of steps that are not validated in the ruleflow. The mechanism is similar where tasks and/or paths that were tested can have a different visual indicator than those tasks and/or paths that were not tested. This helps identify areas of the project flow that are not being tested adequately and hence need more attention.

FIG. 9 is a graphical representation of a coverage report 900 illustrating which rules are validated for a given test case. It is important to note that a given test case may have triggered more than one rule across different decision entities and hence can be listed in all the entity reports where it triggered a rule. This coverage report 900 is applicable for all rulesets which includes decision metaphors. Clicking on the coverage details can generate the visualization for the ruleset metaphor (if applicable). This kind of report helps in impact analysis to ensure relevant test cases are updated whenever a rule is changed.

Figure 10:
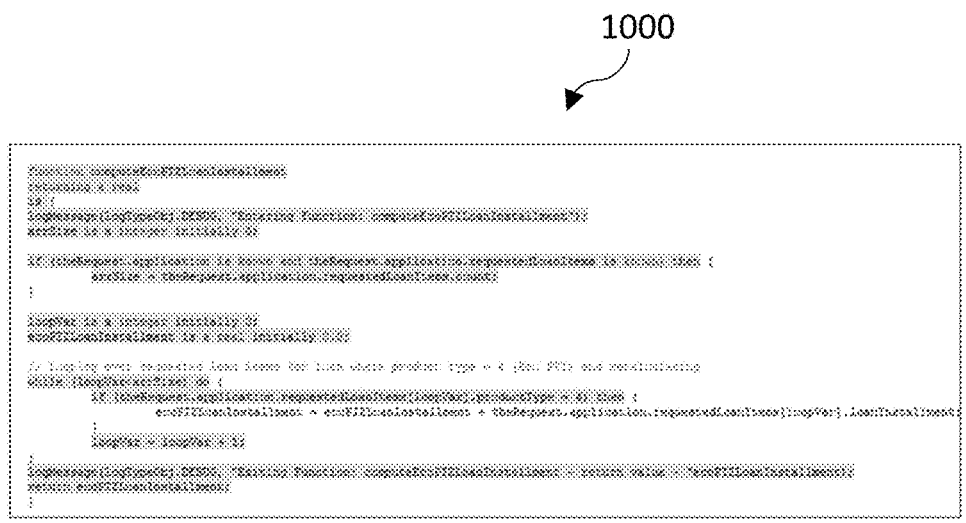
FIG. 10 is a graphical representation of structured rule language code highlighting the rules that are validated for a given test case.

FIG. 10 is a graphical representation of structured rule language code 1000 highlighting the rules that are validated for a given test case. A portion of the code that is used for a given decision code module 250 can be graphically rendered. When the decision code module 250 is provided data as part of a testing procedure, some or all of the code lines in the decision code module 250 can be executed. In some implementations, the rendered SRL code that was executed can be highlighted or have a visual indication that identifies it as having been executed. The SRL code shown can be extracted from the project and can be shown a manner similar to a code preview carried out in the IDE. Additionally, the SRL code can have full syntax highlighting support to ensure better readability. Keywords, identifiers, strings, and the like can be highlighted for better readability. The coloring scheme can be customizable by way of adding different CSS skins to the viewer.

Figure 11:
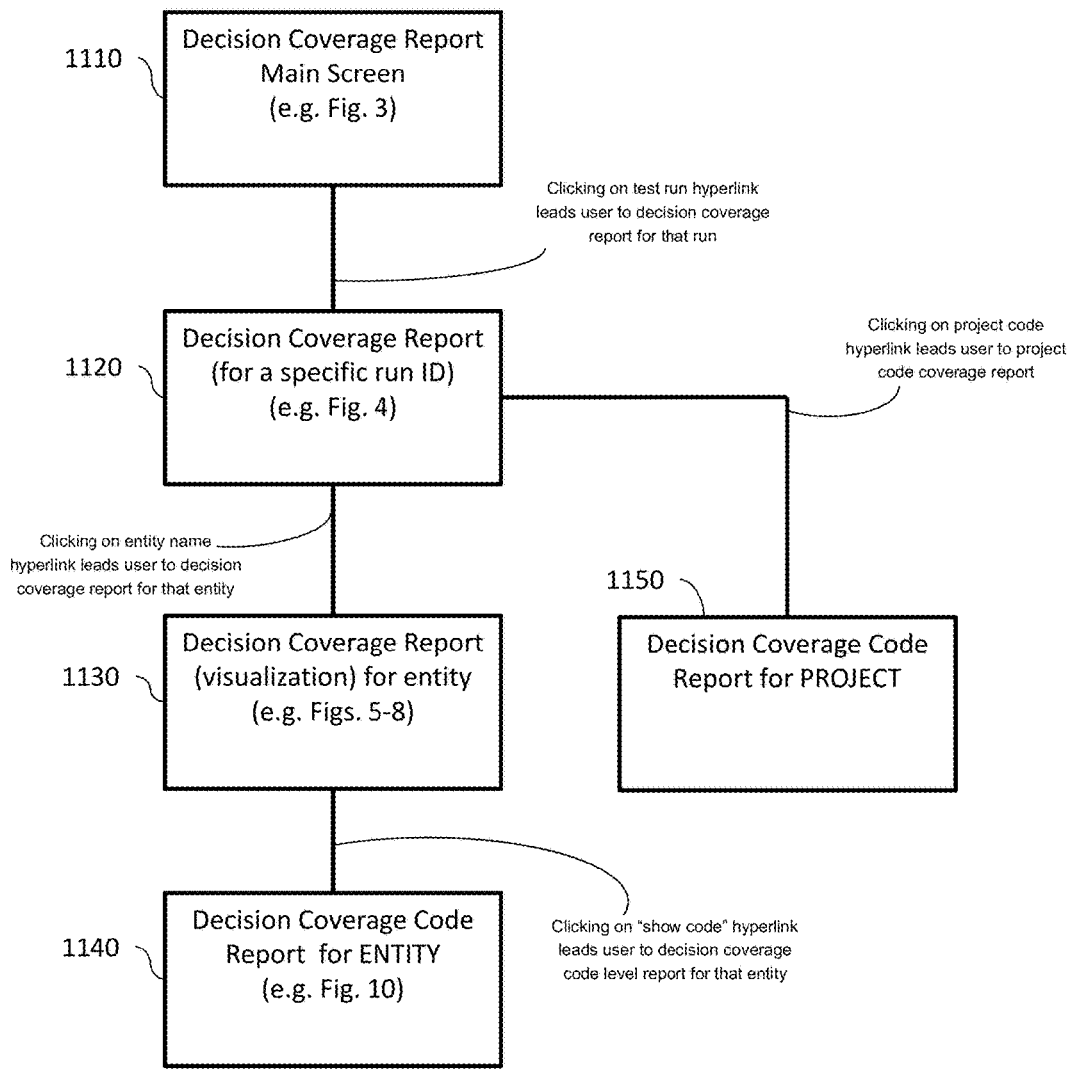
FIG. 11 is a screen flow diagram illustrating navigation options through the visualizations of FIGS. 3-10.

FIG. 11 is a screen flow diagram illustrating navigation options through the visualizations of FIGS. 3-10. In some implementations, the reports described herein can be visualizations that are displayed at a display device. The visualizations can be for example, webpages, touch screen applications, or other graphical user interfaces that the user can navigate to view different reports. One method of navigation is to have some portions of the visualizations be hyperlinked. The hyperlinking can cause a different visualization to be rendered at the display device when the hyperlink is clicked, selected, or otherwise activated by the user.

One example of a screen flow, based on an exemplary connection scheme of hyperlinks, is shown in FIG. 11. At 1110, a decision coverage report main screen (corresponding to FIG. 3) can be displayed. When a user clicks on, for example, a "run ID" hyperlink, this can cause the decision coverage report for a specific run ID to be displayed at 1120. The decision coverage reports can include, for example, the decision coverage report illustrated in FIG. 4. Clicking on an entity name in the decision coverage report can, at 1130, cause a decision coverage report for that entity to be displayed. Examples of such reports are shown in FIGS. 5-8. In some implementations, the reports shown in FIGS. 5-8 can have hyperlinks causing the displaying of project or entity code that was invoked during testing. The hyperlinks, for example, the "show code" hyperlinks shown in FIGS. 5 and 6, can cause code to be displayed in the manner described in FIG. 10. Similarly, clicking on a project code hyperlink (not shown) can, at 1150, cause a decision coverage code report for the entire project to be displayed. The decision coverage code report can be similar to that shown in FIG. 10 at the entity level, but include all the code throughout the project which was invoked during testing.

Figure 12:
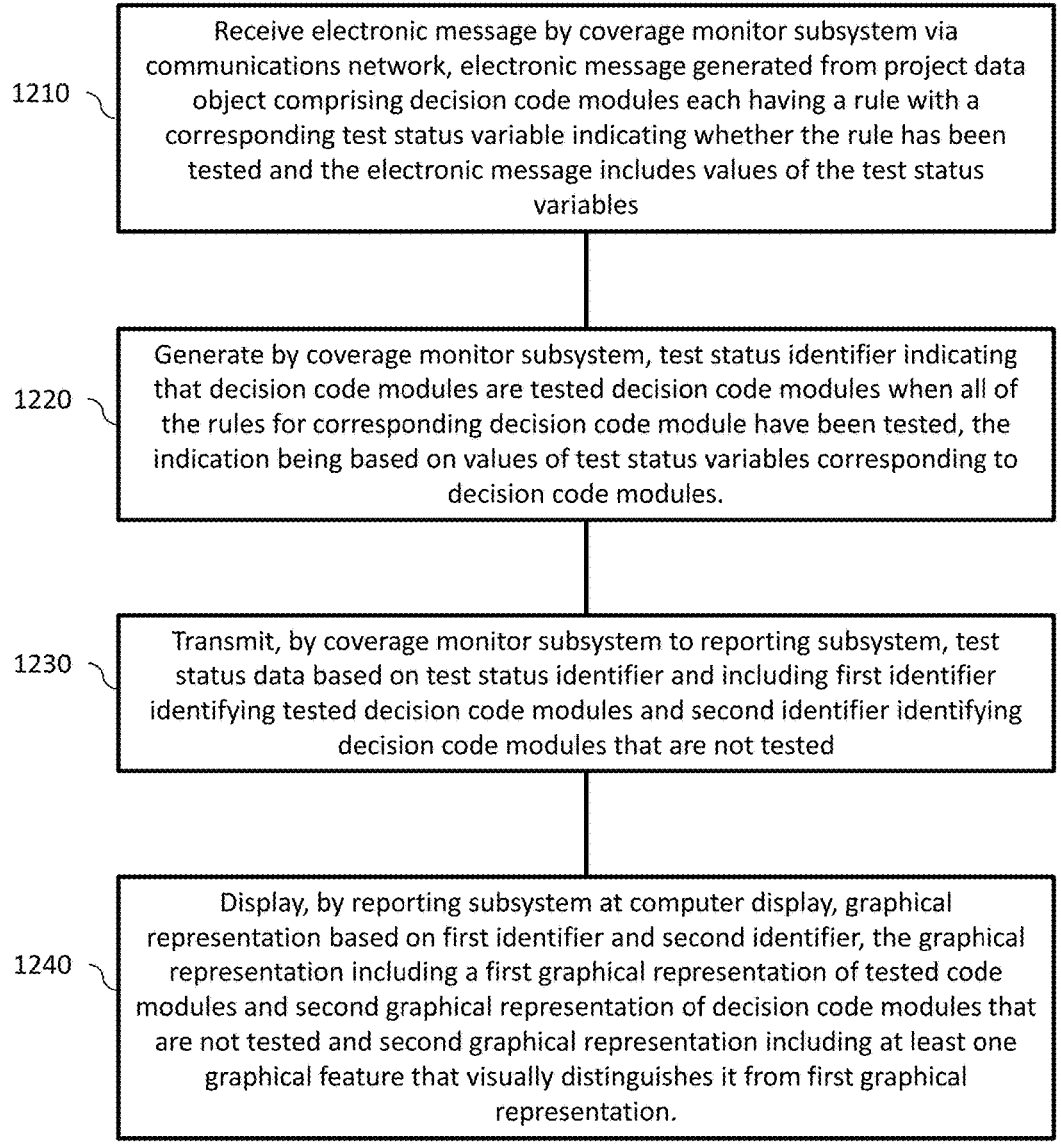
FIG. 12 is a process flow diagram consistent with some exemplary methods described herein.

FIG. 12 is a process flow diagram consistent with some exemplary methods described herein.

At 1210, an electronic message can be received by the coverage monitor subsystem via communications network. The electronic message can be generated from the project data object. The project data object can include decision code modules each having a rule with a corresponding test status variable indicating whether the rule has been tested. The electronic message can include values of the test status variables.

At 1220, test status identifier can be generated by the coverage monitor subsystem. The test status identifier can indicate that decision code modules are tested decision code modules when all of the rules for corresponding decision code module have been tested. The indication can be based on values of test status variables corresponding to decision code modules.

At 1230, test status data can be transmitted, by coverage monitor subsystem to reporting subsystem. The test status data can be based on test status identifier and include a first identifier identifying tested decision code modules and a second identifier identifying decision code modules that are not tested.

At 1240, graphical representation based on first identifier and second identifier, the graphical representation can be transmitted by the coverage monitor subsystem to reporting subsystem. The graphical representation can include a first graphical representation of tested code modules and a second graphical representation of decision code modules that are not tested. The second graphical representation can include at least one graphical feature that visually distinguishes it from first graphical representation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The present invention will be described by ways of embodiments. It should be noted that following embodiments do not limit the appended claims and all the combinations of the features described in the embodiments are not necessarily essential to the means for solving the problems of the embodiments.

What is claimed is:

1. A computer-implemented method comprising:
receiving, by a coverage monitor subsystem, an electronic message via a communications network, the electronic message being generated from a project data object stored in a computer memory, the project data object comprising a plurality of decision code modules where each of the decision code modules comprises at least one rule that has a corresponding test status variable indicating whether the at least one rule has been tested, the electronic message comprising values of the test status variables;
generating, by the coverage monitor subsystem in response to the electronic message, a test status identifier, the test status identifier comprising:
   a module identifier, identifying a decision code module of the plurality of decision code modules; and
   an indication that the decision code module is a tested decision code module when all of the at least one rules for the decision code module have been tested, the indication based on a value of the corresponding test status variable associated with the decision code module;
transmitting, by the coverage monitor subsystem to a reporting subsystem, test status data based on the test status identifier, the test status data comprising a first identifier identifying tested decision code modules and a second identifier identifying decision code modules that are not tested; and
displaying, by the reporting subsystem at a computer display, a graphical representation based on the first identifier and the second identifier, the graphical representation comprising:
   a first graphical representation of the tested decision code modules; and
   a second graphical representation of the decision code modules that are not tested, where the second graphical representation contains at least one graphical feature that visually distinguishes it from the first graphical representation.

2. The method of claim 1, wherein the graphical representation further comprises a run identifier corresponding to a previous transmitting of the first identifier and the second identifier.

3. The method of claim 1 wherein the graphical representation further comprises:
   a total number of the decision code modules; and
   a tested number of the decision code modules.

4. The method of claim 3, wherein the graphical representation further comprises the total number and the tested number, each over a pre-defined time period.

5. The method of claim 1, further comprising transmitting a test entity list to the reporting subsystem, the test entity list comprising a plurality of tests that had been previously executed on at least one entity comprising the project data object.

6. The method of claim 1, wherein the graphical representation further comprises:
   a first graphical representation of a first test metric and a second graphical representation of a second test metric, each of the test metrics having a corresponding decision code module;
   a second graphical representation identifying an outcome based on the first test metric and the second test metric; and
   a third graphical representation indicating whether the decision code modules corresponding to the first test metric and the second test metric are all tested.

7. A computer program product comprising a non-transient, machine-readable medium storing instructions which, when executed by at least one programmable processor, cause the at least one programmable processor to perform operations comprising:

receiving, by a coverage monitor subsystem, an electronic message via a communications network, the electronic message being generated from a project data object stored in a computer memory, the project data object comprising a plurality of decision code modules where each of the decision code modules comprises at least one rule that has a corresponding test status variable indicating whether the at least one rule has been tested, the electronic message comprising values of the test status variables;
generating, by the coverage monitor subsystem in response to the electronic message, a test status identifier, the test status identifier comprising:
   a module identifier, identifying a decision code module of the plurality of decision code modules; and
   an indication that the decision code module is a tested decision code module when all of the at least one rules for the decision code module have been tested, the indication based on a value of the corresponding test status variable associated with the decision code module;
transmitting, by the coverage monitor subsystem to a reporting subsystem, test status data based on the test status identifier, the test status data comprising a first identifier identifying tested decision code modules and a second identifier identifying decision code modules that are not tested; and
displaying, by the reporting subsystem at a computer display, a graphical representation based on the first identifier and the second identifier, the graphical representation comprising:
   a first graphical representation of the tested decision code modules; and
   a second graphical representation of the decision code modules that are not tested, where the second graphical representation contains at least one graphical feature that visually distinguishes it from the first graphical representation.

8. The computer program product of claim 7, wherein the graphical representation further comprises a run identifier corresponding to a previous transmitting of the first identifier and the second identifier.

9. The computer program product of claim 7, wherein the graphical representation further comprises:
   a total number of the decision code modules; and
   a tested number of the decision code modules.

10. The computer program product of claim 7, wherein the graphical representation further comprises the total number and the tested number, each over a pre-defined time period.

11. The computer program product of claim 7, further comprising transmitting a test entity list to the visualization system, the test entity list comprising a plurality of tests that had been previously executed on at least one entity comprising the project.

12. The computer program product of claim 7, wherein the graphical representation further comprises:
   a first graphical representation of a first test metric and a second graphical representation of a second test metric, each of the test metrics having a corresponding decision code module;
   a second graphical representation identifying an outcome based on the first test metric and the second test metric; and
   a third graphical representation indicating whether the decision code modules corresponding to the first test metric and the second test metric are all tested.

13. A system comprising:
a programmable processor; and
a non-transient machine-readable medium storing instructions which, when executed by the processor, cause the at least one programmable processor to perform operations comprising:
  receiving, by a coverage monitor subsystem, an electronic message via a communications network, the electronic message being generated from a project data object stored in a computer memory, the project data object comprising a plurality of decision code modules where each of the decision code modules comprises at least one rule that has a corresponding test status variable indicating whether the at least one rule has been tested, the electronic message comprising values of the test status variables;
  generating, by the coverage monitor subsystem in response to the electronic message, a test status identifier, the test status identifier comprising:
    a module identifier, identifying a decision code module of the plurality of decision code modules; and
    an indication that the decision code module is a tested decision code module when all of the at least one rules for the decision code module have been tested, the indication based on a value of the corresponding test status variable associated with the decision code module;
  transmitting, by the coverage monitor subsystem to a reporting subsystem, test status data based on the test status identifier, the test status data comprising a first identifier identifying tested decision code modules and a second identifier identifying decision code modules that are not tested; and
  displaying, by the reporting subsystem at a computer display, a graphical representation based on the first identifier and the second identifier, the graphical representation comprising:
    a first graphical representation of the tested decision code modules; and
    a second graphical representation of the decision code modules that are not tested, where the second graphical representation contains at least one graphical feature that visually distinguishes it from the first graphical representation.

14. The system of claim 13, wherein the graphical representation further comprises a run identifier corresponding to a previous transmitting of the first identifier and the second identifier.

15. The system of claim 13, wherein the graphical representation further comprises:
  a total number of the decision code modules; and
  a tested number of the decision code modules.

16. The system of claim 13, wherein the graphical representation further comprises the total number and the tested number, each over a pre-defined time period.

17. The system of claim 13, further comprising transmitting a test entity list to the visualization system, the test entity list comprising a plurality of tests that had been previously executed on at least one entity comprising the project.

18. The system of claim 13, wherein the graphical representation further comprises:
  a first graphical representation of a first test metric and a second graphical representation of a second test metric, each of the test metrics having a corresponding decision code module;
  a second graphical representation identifying an outcome based on the first test metric and the second test metric; and
  a third graphical representation indicating whether the decision code modules corresponding to the first test metric and the second test metric are all tested.

* * * * *